US008890845B2

(12) United States Patent
Lin (10) Patent No.: US 8,890,845 B2
(45) Date of Patent: Nov. 18, 2014

(54) OPTICAL TOUCH SCREEN (75) Inventor: Chien-Hung Lin, Guishan Township, Taoyuan County (TW)

(73) Assignee: Quanta Computer Inc., Tao Yuan Shien (TW)

(*) Notice: Subject to any disclaimer, the term of this patent is extended or adjusted under 35 U.S.C. 154(b) by 422 days.

(21) Appl. No.: 12/954,098

(22) Filed: Nov. 24, 2010

(65) Prior Publication Data
US 2012/0013577 A1    Jan. 19, 2012

(30) Foreign Application Priority Data
Jul. 15, 2010 (TW) ............................. 99123351 A (51) Int. Cl.
*G06F 3/042* (2006.01)

(52) U.S. Cl.
CPC .................................. *G06F 3/0428* (2013.01)
USPC ......................................... 345/175; 345/173

(58) Field of Classification Search
CPC ........... G02B 6/00; G02B 1/00; G02B 6/0011
USPC ................................................. 345/173–175
See application file for complete search history.

(56) References Cited

U.S. PATENT DOCUMENTS 5,776,636 A * 7/1998 Kunisawa et al. ................. 430/5
7,099,553 B1 * 8/2006 Graham et al. ............... 385/146
2008/0093542 A1 * 4/2008 Lieberman et al. ....... 250/227.14
2010/0046200 A1 * 2/2010 Kuo ............................. 362/97.1
2010/0090987 A1   4/2010 Lin et al.
2010/0302209 A1 * 12/2010 Large ............................ 345/175
2010/0309169 A1 * 12/2010 Lieberman et al. ........... 345/175

FOREIGN PATENT DOCUMENTS

TW           I274827    *   3/1995   ............ G02F 1/1335

OTHER PUBLICATIONS

Chapter 19 of Al-Azzawi's book titled "Photonics—Principles and Practices", dated 2006, is attached as the pdf file named as "photoics_ch19_by Al-Azzawi.pdf".*

* cited by examiner

*Primary Examiner* — Grant Sitta
*Assistant Examiner* — Charles Zheng
(74) *Attorney, Agent, or Firm* — Rabin & Berdo, P.C.

(57) ABSTRACT

An optical touch structure including a light guide element, a light source, a reflecting mirror, and an image sensor is provided. The light guide element has a light-emitting surface. The light guide element guides the light provided by the light source to the light-emitting surface. The extending direction of the reflecting mirror is substantially perpendicular to the light-emitting surface. The intersection of the reflecting mirror and the light guide element is defined as a first position. The light guide element and the reflecting mirror define a touch range. The image sensor is disposed on a second position opposite to the first position. The sensing area of the image sensor at least covers the touch range. When the proceeding path of the first direction light is shorter than that of the second direction light, the strength of the second direction light is larger than that of the first direction light.

14 Claims, 6 Drawing Sheets

OPTICAL TOUCH SCREEN

This application claims the benefit of Taiwan application Serial No. 99123351, filed Jul. 15, 2010, the subject matter of which is incorporated herein by reference.

BACKGROUND OF THE INVENTION

1. Field of the Invention

The invention relates in general to a touch structure, and more particularly to an optical touch structure.

2. Description of the Related Art

Figure 1:
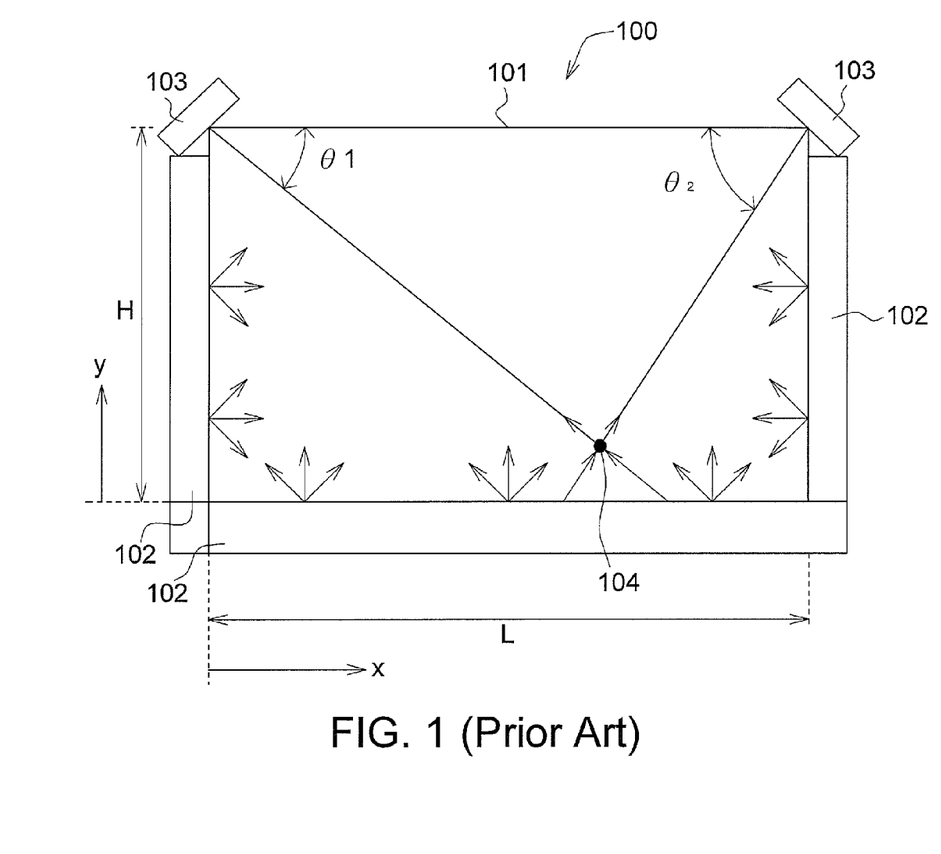
FIG. 1 shows a top view of an optical touch structure according to prior art.

Referring to FIG. 1, a top view of an optical touch structure 100 according to prior art is shown. The generally known optical touch structure 100 includes three light source assemblies 102 and two image sensors 103. The light source assemblies 102 form a uniformed light source. The three light source assemblies 102 define a touch range 101. Each of the two image sensors 103 is disposed on a position adjacent to a light source assembly 102 for respectively sensing the touch range 101. During the touch control process, a touch point 104 appears in the touch range 101, and the image sensor 103 detects the touch point 104 as a dark point. The position (x, y) of the touch point 104 in the touch range 101 is obtained from the parameters including the angles $\theta_1$ and $\theta_2$ as well as the length L and the width H of the touch range 101 respectively sensed by two image sensors 103.

However, the touch structure 100, which requires too many light source assemblies 102 and image sensors 103, will incur higher cost, result in heavier structure, and consume more energy.

SUMMARY OF THE INVENTION

The invention is directed to an optical touch device, which uses fewer light guide element, light sources and image sensors and uniformizes the light in the sensing area of the image sensor, hence increasing the sensing accuracy of the image sensor.

According to a first aspect of the present invention, an optical touch structure including a light guide element, a light source, a reflecting mirror, and an image sensor is provided. The light guide element has a light-emitting surface. The light source is adjacent to the light guide element. The light guide element guides the light provided by the light source to the light-emitting surface. The reflecting mirror is disposed at one side of the light guide element and the extending direction of the reflecting mirror is substantially perpendicular to the light-emitting surface. The intersection of the reflecting mirror and the light guide element is defined as a first position. The light guide element and the reflecting mirror define a touch range. The image sensor is disposed on a second position opposite to the first position. The sensing area of the image sensor at least covers the touch range. The light-emitting point on the light-emitting surface of the light guide element emits a first direction light transmitted towards the image sensor directly and a second direction light transmitted towards the image sensor through the reflecting mirror. When the proceeding path of the first direction light is shorter than that of the second direction light, the strength of the second direction light is larger than that of the first direction light.

The above and other aspects of the invention will become better understood with regard to the following detailed description of the preferred but non-limiting embodiment(s). The following description is made with reference to the accompanying drawings.

DETAILED DESCRIPTION OF THE INVENTION

The implementation of the optical touch structure of the invention will be disclosed in a number of preferred embodiments below. However, the disclosure of the following embodiments is for exemplification only, not for limiting the scope of protection of the invention.

First Embodiment

Figure 2A:
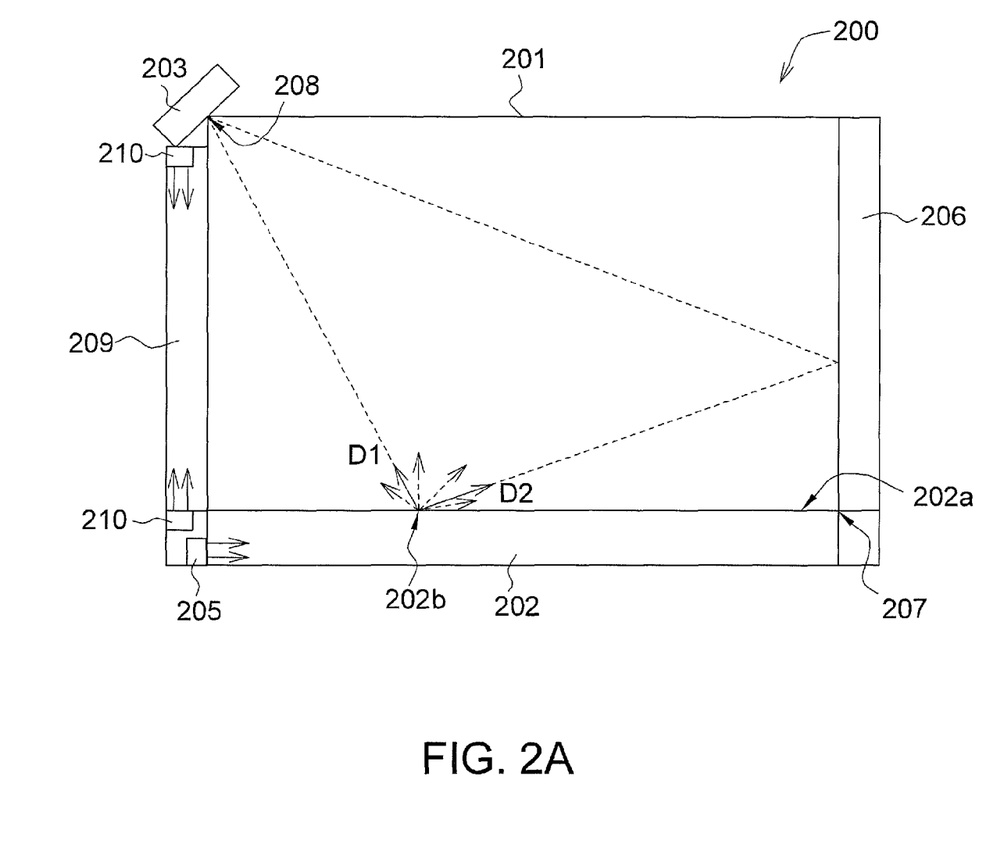
FIG. 2A shows a top view of an optical touch structure according to a first embodiment of the invention.

Referring to FIG. 2A, a top view of an optical touch structure 200 according to a first embodiment of the invention is shown. The optical touch structure 200 of the present embodiment of the invention includes a light guide element 202, a light source 205, a reflecting mirror 206, and an image sensor 203. The light guide element 202 has a light-emitting surface 202a. The light source 205 is adjacent to the light guide element 202. The light guide element 202 guides the light provided by the light source 205 to the light-emitting surface 202a. The reflecting mirror 206 is disposed at one side of the light guide element 202, and the extending direction of the reflecting mirror is substantially perpendicular to the light-emitting surface 202a. The intersection of the light guide element 202 and the reflecting mirror 206 is defined as a first position 207. The light guide element 202 and the reflecting mirror 206 define a touch range 201. The image sensor 203 is disposed on a second position 208 opposite to the first position 207. The sensing area of the image sensor 203 at least covers the touch range 201.

The light-emitting point 202b on the light-emitting surface 202a of the light guide element 202 emits a first direction light D1 (denoted by an arrow with solid line in FIG. 2A) transmitted towards the image sensor 203 directly and a second direction light D2 (denoted by an arrow with solid line in FIG. 2A) transmitted towards the image sensor 203 through the reflecting mirror 206. When the proceeding path of the first direction light D1 is shorter than that of the second direction light D2, the strength of the second direction light D2 is larger than that of the first direction light D1.

To make the strength of the second direction light D2 larger than that of the first direction light D1 when the proceeding path of the first direction light D1 is shorter than that of the second direction light D2, the light emitted from the light source 205 is transmitted towards the reflecting mirror 206.

In the present embodiment of the invention, the optical touch structure 200 further includes a light guide element 209 and a light source 210. The light guide element 209 is disposed on a position of the touch range 201 opposite to the reflecting mirror 206, and is adjacent to the second position 208 and the light guide element 202. The light source 210 is adjacent to the light guide element 209. The number of light sources 205 and 210 is not limited to one, and multiple light sources 205 and 210 can do as well.

The optical touch structure of the present embodiment of the invention uses fewer image sensor, light guide elements, and light sources than the generally known optical touch structure does, hence incurring lower cost and resulting in less weight, and less energy is consumed by the light source and the image sensor.

Figure 2B:
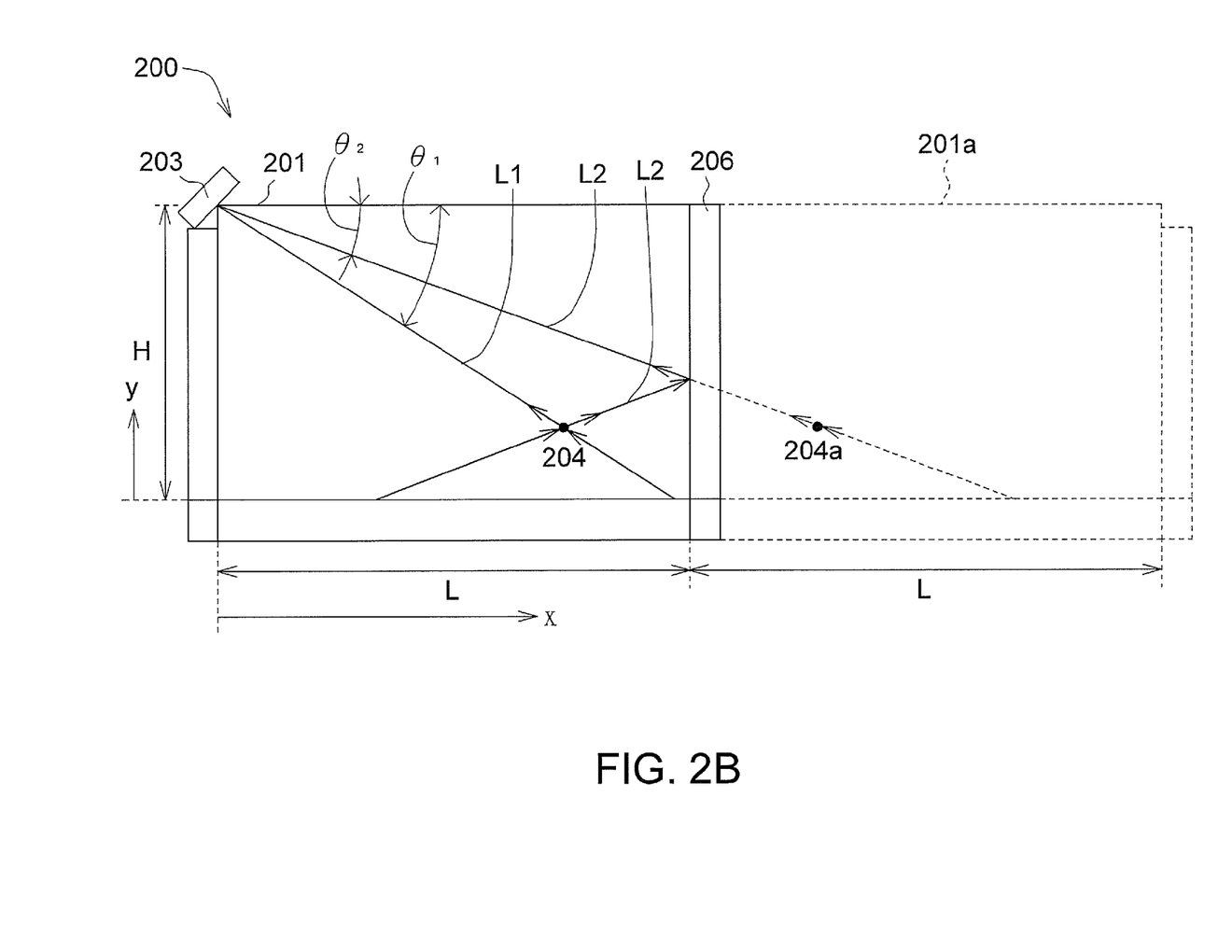
FIG. 2B shows a top view of an optical touch structure in touch state according to a first embodiment of the invention.

Referring to FIG. 2B, a top view of an optical touch structure 200 in touch state is shown. The reflecting mirror 206 of the optical touch structure 200 provides an image of the sensing area 201, that is, a reflection sensing area 201a. The image sensor 203 senses the touch range 201 and the reflection sensing area 201a. During the touch control process, a touch point 204 appears in the touch range 201, a reflection touch point 204a appears in the sensing area 201a, and the image sensor 203 detects the touch point 204 and the reflection touch point 204a as two dark points. The position (x, y) of the touch point 204 in the touch range 201 is obtained from the parameters including the angles $\theta_1$ and $\theta_2$ as well as the length L and the width H of the touch range 201 corresponding to the two dark points respectively.

The proceeding path L2 of the light transmitted towards the image sensor 203 through the reflecting mirror 206 is normally longer than the proceeding path L1 of the light directly transmitted towards the image sensor 203. In general, the strength of the light is inversely proportional to the square of the length of the light proceeding path.

If the light guided by the light guide element of the optical touch structure is an ordinary light, then the light received by the image sensor 203 will not be uniform. That is, the strength of the light passing through the reflecting mirror 206 is lower than that directly transmitted towards the image sensor 203. Thus, the image sensor 203 will have poor recognition with respect to the reflection touch point 204a, and the sensing accuracy at the angle $\theta_2$ may deteriorate and even affect the calculation of the position of the touch point 204.

In the present embodiment of the invention, the proceeding path of the first direction light D1 is shorter than that of the second direction light D2, and the strength of the second direction light D2 passing through the reflecting mirror 206 is larger than that of the first direction light D1, so the light received by the image sensor 203 is more uniformed. Therefore, the present embodiment of the invention maintains the recognition accuracy with respect to the reflection touch point 204a and the sensing accuracy at the angle $\theta_2$, and makes the calculation of the position of the touch point 204 even more accurate.

Second Embodiment

Figure 3A:
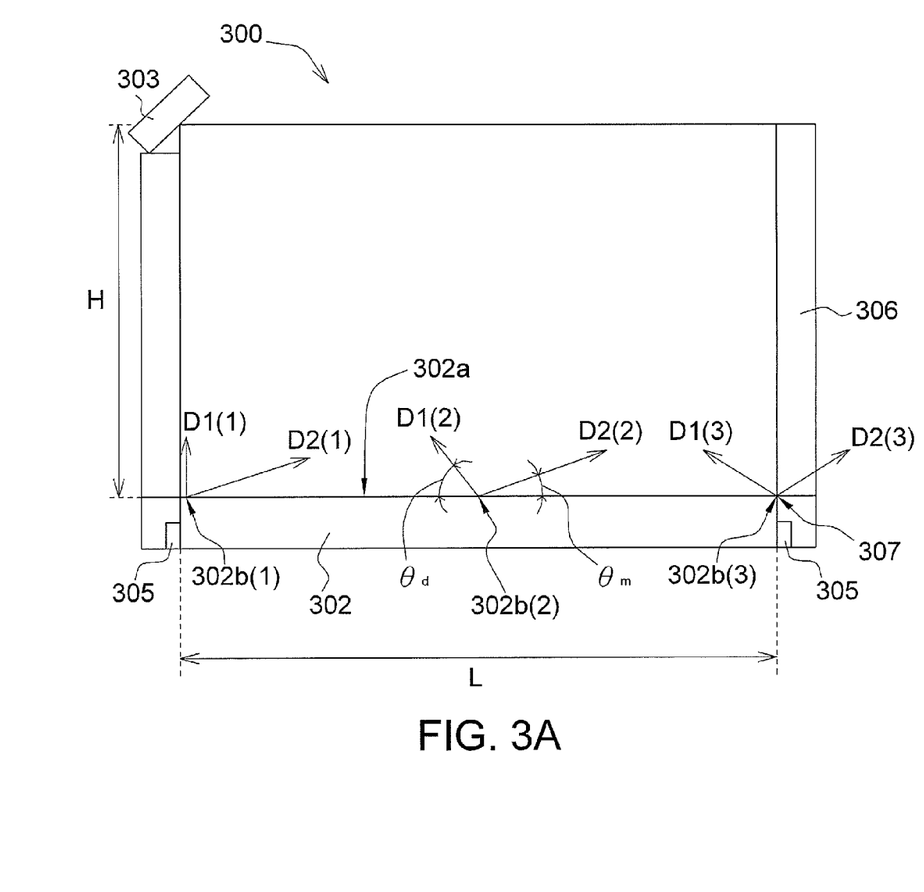
FIG. 3A shows a top view of an optical touch structure according to a second embodiment of the invention.

Referring to FIG. 3A, a top view of an optical touch structure 300 according to a second embodiment of the invention is shown. The optical touch structure 300 is different from that showed in the first embodiment in that the light guide element of the present embodiment further makes most of the light emitted at each light-emitting point become a first direction light D1 or a second direction light D2, and the light amount of the first direction light D1 and that of the second direction light D2 can be pre-determined. Thus, the strengths of the lights of different directions can be more precisely controlled.

Figure 3B:
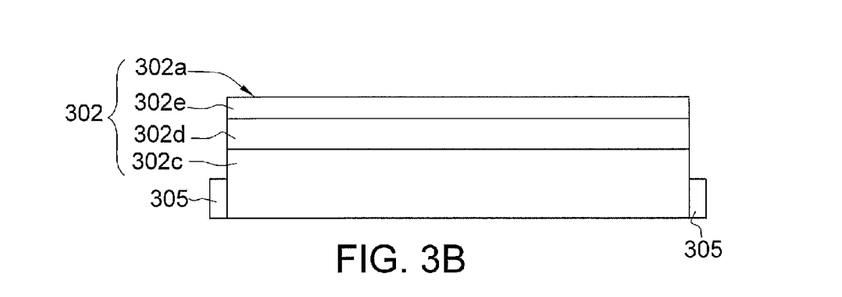
FIG. 3B shows a top view of a light guide element according to a second embodiment of the invention.

Referring to FIG. 3B, an illustration of a light guide element 302 according to a second embodiment of the invention is shown. The light guide element 302 includes a guide layer 302c, an alignment layer 302d and a light splitting layer 302e. The guide layer 302c guides the light provided by the light source 305 to the alignment layer 302d uniformly. The alignment layer 302d is disposed between the guide layer 302c and the light splitting layer 302e for aligning the light guided by the guide layer 302c to the light splitting layer 302e in a direction substantially perpendicular to the guide layer 302c. The top surface of the light splitting layer 302e is a light-emitting surface 302a. The light splitting layer 302e guides the light parallel aligned by the alignment layer 302d to be emitted from each light-emitting point 302b substantially in two different directions, such as the first direction light D1 and the second direction light D2 as indicated in FIG. 3A.

Figure 3C:
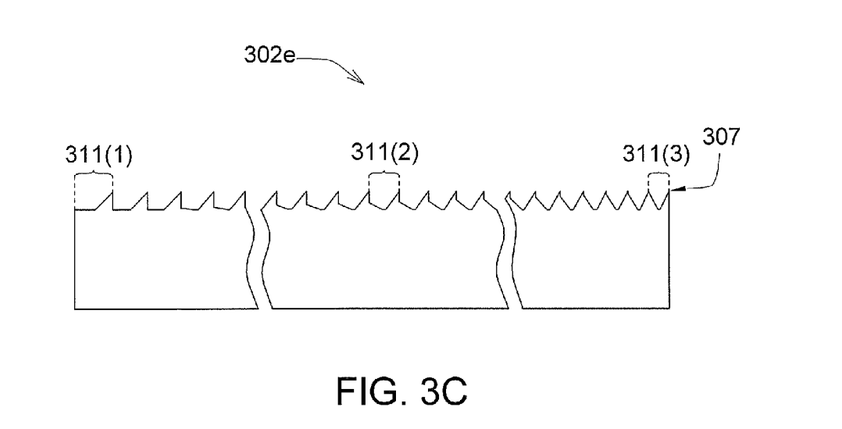
FIG. 3C shows a top view of a light splitting layer according to a second embodiment of the invention.
Figure 3D:
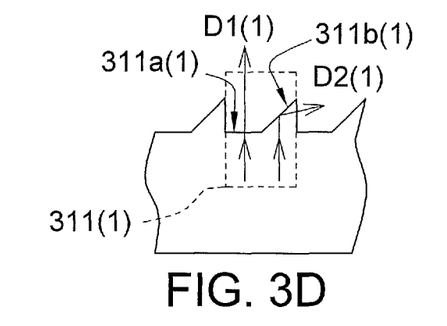
FIGS. 3D, 3E, 3F show the splitting of the light by a light splitting device according to a second embodiment of the invention.
Figure 3E:
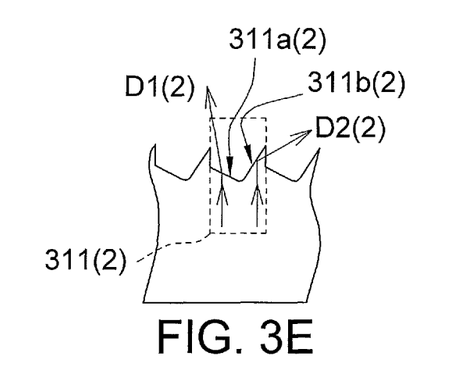
Figure 3F:
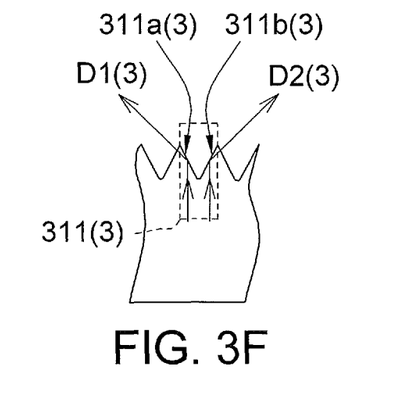

Referring to FIGS. 3C, 3D, 3E, and 3F. FIG. 3C shows a side view of a light splitting layer 302e according to a second embodiment of the invention. FIGS. 3D, 3E, 3F show an illustration of the light split by a light splitting device 311 according to a second embodiment of the invention.

As indicated in FIG. 3C, the light splitting layer 302e has a plurality of light splitting devices 311 such as light splitting devices 311(1), 311(2) and 311(3). As indicated in FIGS. 3D, 3E, 3F, the light splitting devices 311(1), 311(2) and 311(3) respectively have the first planes 311a(1), 311a(2) and 311a(3) and the second planes 311b(1), 311b(2) and 311b(3). The light of the light guide element 302 is processed by the first plane 311a of the light splitting device 311 corresponding to the light-emitting point 302b to provide a first direction light D1. The light of the light guide element is processed by the second plane 311b of the light splitting device 311 corresponding to the light-emitting point 302b to provide a second direction light D2.

As indicated in FIG. 3D, when light-emitting point 302b is away from the first position 307, such as the light-emitting point 302b(1), the light of the light guide element 302 passes through the first plane 311a(1) of the light splitting device 311(1) corresponding to the light-emitting point 302b(1) to provide the first direction light D1(1). The light of the light guide element 302 is totally reflected by the second plane 311b(1) of the light splitting device 311(1) corresponding to the light-emitting point 302b(1) to provide the second direction light D2(1). The inclination angle of the second plane 311b(1) ranges between 45~90 degrees. Thus, the first direction light D1(1) is transmitted towards the image sensor 303 directly, and, by way of adjusting the inclination angle of the second plane 311b(1), the second direction light D2(1) is transmitted towards the image sensor 303 through the reflecting mirror 306.

In the present embodiment of the invention, when the light-emitting point 302b, such as from the light-emitting point 302b(2), approaches the first position 307 from a position away from the first position 307 as indicated in FIG. 3E, the light of the light guide element 302 is deflected and passes through the first plane 311a(2) of the light splitting device 311(2) corresponding to the light-emitting point 302b(2) to provide the first direction light D1(2). The light of the light guide element 302 is totally reflected on the second plane 311b(2) of the light splitting device 311(2) corresponding to the light-emitting point 302b(2) to provide the second direction light D2(2). The inclination angle of the first plane 311a(2) is smaller than that of the second plane 311b(2), which ranges between 45~90 degrees. By way of adjusting the inclination angles of the first plane 311a(2) and the second plane 311b(2), the first direction light D1(2) is transmitted towards the image sensor 303 directly and the second direction light D2(2) is transmitted towards the image sensor 303 through the reflecting mirror 306.

In the present embodiment of the invention as indicated in FIG. 3F, when light-emitting point 302b, such as the light-emitting point 302b(3), gradually approaches the first position 307, the light of the light guide element 302 is totally reflected on the first plane 311a(3) of the light splitting device 311(3) corresponding to the light-emitting point 302b to provide the first direction light D1(3). The light of the light guide element 302 is also totally reflected on the second plane 311b(3) of the light splitting device 311(3) corresponding to the light-emitting point 302b(3) to provide the second direction light D2(3). Moreover, the inclination angle of the first plane 311a of light splitting device 311 corresponding to the light-emitting point 302 of the first position 307 is substantially equal to that of the second plane 311b.

In the present embodiment of the invention, most of the projection amount of the first plane 311a of the light splitting device 311 on the light-emitting surface 302a is smaller than that of the second plane 311b on the light-emitting surface 302a. Thus, the strength of the first direction light D1 (with a shorter proceeding path) provided after the light is processed by the first plane 311a of the light splitting device 311 is smaller than the strength of the second direction light D2 (with a longer proceeding path) provided after the light is processed by the second plane 311b of the light splitting device 311.

In the present embodiment of the invention, as indicated in FIG. 3A, the first light-emitting angle $\theta_d$ is defined between the first direction light D1, the light-emitting surface 302a, the second light-emitting angle $\theta_m$ is defined between the second direction light D2 and the light-emitting surface 302a, and the first light-emitting angle $\theta_d$ and the second light-emitting angle $\theta_m$ are respectively obtained according to the following formulas:

the first light-emitting angle $\theta_d(x) = \tan^{-1}(H/x)$, $x=0\sim L$;

the second light-emitting angle $\theta_m(x) = \tan^{-1}[H/(2L-x)]$, $x=0\sim L$;

Wherein,
H denotes the length of the reflecting mirror;
L denotes the length of the light guide element;
x denotes the position on the light guide element;
x=0 denotes where the light guide element starts to separate from the first position 307;
x=L denotes the first position 307.

Let the touch panel whose aspect ratio is 16:9 be taken for example. At the light-emitting point 302b (located at the leftmost end of the light guide element 302 of FIG. 3A) which is afar from the first position 307, the first light-emitting angle $\theta_d$ between the first direction light D1 and the light-emitting surface 302a of the light guide element 302 is about 90 degrees, and the second light-emitting angle $\theta_m$ between the second direction light D2 and the light-emitting surface 302a of the light guide element 302 is about 15.7 degrees. At the light-emitting point 302b (located at the central part of the light guide element 302 of FIG. 3A) of the light guide element 302, the first light-emitting angle $\theta_d$ between the first direction light D1 and the light-emitting surface 302a of the light guide element 302 is about 48.4 degrees, and the second light-emitting angle $\theta_m$ between the second direction light D2 and the light-emitting surface 302a of the light guide element 302 is about 20.6 degrees. At the light-emitting point 302b (located at the rightmost end of the light guide element 302 of FIG. 3A) which is near the first position 307, the first light-emitting angle $\theta_d$ between the first direction light D1 and the light-emitting surface 302a of the light guide element 302 is about 29.4 degrees, and the second light-emitting angle $\theta_m$ between the second direction light D2 and the light-emitting surface 302a of the light guide element 302 is also about 29.4 degrees.

Based on the length of the optical path corresponding to the light of a particular angle, the projection amount of the first plane 311a on the light-emitting surface 302a and that of the second plane 311b on the light-emitting surface 302a can be designed accordingly. Thus, the light with a longer proceeding path can have larger strength, and the light directly transmitted towards the image sensor 303 can have similar strength with the light transmitted towards the image sensor through the reflecting mirror, so that the image sensor 303 has higher accuracy in judging the position (x, y) of the touch point 204 in the touch range 201.

According to the optical touch structure disclosed in the above embodiments, through the distribution between the projection amount of the first plane 311a on the light-emitting surface 302a and that of the second plane 311b on the light-emitting surface 302a, the strength of most of the first direction light D1 provided after the light is processed by the first plane 311a of the light splitting device 311 is smaller than that of the second direction light D2 provided after the light is processed by the second plane 311b of the light splitting device 311, so that the strength of the light received by the image sensor 303 in the sensing area is more uniformed, and the sensing accuracy of the image sensor is further increased.

The light guide element of the optical touch structure of the invention is made from a material whose refractive index ranges between 1.4~1.6. For example, the light guide element is made from polymethylmethacrylate (PMMA).

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optical touch structure, comprising:
   a light guide element having a light-emitting surface;
   a light source adjacent to the light guide element, wherein the light guide element guides the light provided by the light source to the light-emitting surface;
   a reflecting mirror disposed at one side of the light guide element, wherein the extending direction of the reflecting mirror is substantially perpendicular to the light-emitting surface, the intersection of the light guide element and the reflecting mirror defines a first position, and the light guide element and the reflecting mirror define a touch range; and
   an image sensor disposed on a second position opposite to the first position, having a sensing area that at least covers the touch range;
   wherein, a light-emitting point on the light-emitting surface of the light guide element emits a first direction light transmitted towards the image sensor directly and a second direction light transmitted towards the image sensor through the reflecting mirror, and when the proceeding path of the first direction light is shorter than that of the second direction light, the strength of the second direction light is larger than that of the first direction light;
   wherein the light source is disposed adjacent to a corner of the touch range, and the light emitting element is continuously extended to the first position from the corner of the touch range;
   wherein the light guide element comprises a guide layer and a light splitting layer, the guide layer guides the light provided by the light source, and the light splitting layer enables the light guided by the guide layer to be emitted substantially in two different directions; and wherein the light guide element further comprises an alignment layer disposed between the guide layer and the light splitting layer for guiding the light guided by the guide layer to the light splitting layer in a direction substantially perpendicular to the guide layer, and the guide layer, the alignment layer and the light splitting layer are disposed along the direction;
wherein the first direction light and the second direction light are refracted light.

2. The optical touch structure according to claim 1, wherein, the light emitted from the light source is transmitted towards the reflecting mirror.

3. The optical touch structure according to claim 1, wherein, the light splitting layer has a plurality of light splitting devices each having a first plane and a second plane, the light of the light guide element is directed by the first plane of the light splitting device corresponding to the light-emitting point to provide the first direction light, and the light of the light guide element is processed by the first plane of the light splitting device corresponding to the light-emitting point to provide the second direction light.

4. The optical touch structure according to claim 3, wherein, when the light-emitting point is away from the first position, the light of the light guide element penetrates the first plane of the light splitting device corresponding to the light-emitting point to provide the first direction light, and the light of the light guide element is totally reflected by the second plane of the light splitting device corresponding to the light-emitting point to provide the second direction light.

5. The optical touch structure according to claim 3, wherein, when the light-emitting point is away from the first position, the first plane of the light splitting device corresponding to the light-emitting point is substantially horizontal, and the inclination angle of the second plane of the light splitting device corresponding to the light-emitting point ranges between 45 and 90 degrees.

6. The optical touch structure according to claim 3, wherein, any inclination angle of the first plane of the light splitting device is smaller than or equal to the inclination angle of the second plane.

7. The optical touch structure according to claim 3, wherein, when the light-emitting point is adjacent to the first position, the light of the light guide element is totally reflected on the first plane of the light splitting device corresponding to the light-emitting point to provide the first direction light, and the light of the light guide element is totally reflected on the second plane of the light splitting device corresponding to the light-emitting point to provide the second direction light.

8. The optical touch structure according to claim 7, wherein, the inclination angle of the first plane of the light splitting device corresponding to the light-emitting point is substantially equal to the inclination angle of the second plane.

9. The optical touch structure according to claim 1, wherein, the light guide element is made from a material whose refractive index ranges between 1.4 and 1.6.

10. The optical touch structure according to claim 1, wherein, the light guide element is made from polymethylmethacrylate (PMMA).

11. The optical touch structure according to claim 1, further comprising another light guide element and another light source, the another light guide element is disposed on a position in the touch range opposite to the reflecting mirror and is adjacent to the second position and the light guide element, and the another light source is adjacent to the another light guide element.

12. The optical touch structure according to claim 1, wherein, a first light-emitting angle is defined between the first direction light and the light-emitting surface, and the first light-emitting angle is obtained according to the following formula:

the first light-emitting angle $\theta d(x) = \tan^{-1}(H/x)$, $x = 0 \sim L$, wherein H denotes the length of the reflecting mirror;
L denotes the length of the light guide element;
denotes the position on the light guide element;
x=0 denotes where the light guide element starts to separate from the light source; and
x=L denotes the first position.

13. The optical touch structure according to claim 1, wherein, a second light-emitting angle is defined between the second direction light and the light-emitting surface, and the second light-emitting angle is obtained according to the following formula:

the second light-emitting angle $\theta m(x) = \tan^{-1}[H/(2L-x)]$, $x = 0 \sim L$, wherein H denotes the length of the reflecting minor;
L denotes the length of the light guide element;
x denotes the position on the light guide element;
x=0 denotes where the light guide element starts to separate from the light source; and
x=L denotes the first position.

14. The optical touch structure according to claim 1, wherein the number of the image sensor is one.

* * * * *